(No Model.)
A. C. REHBEIN.
PATCH FOR BICYCLE TIRES.
No. 568,794. Patented Oct. 6, 1896.
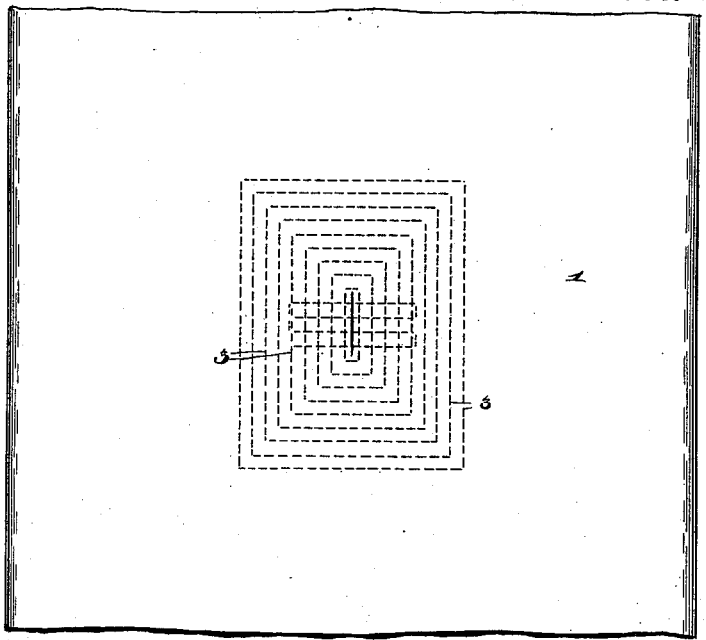
Fig. 1.
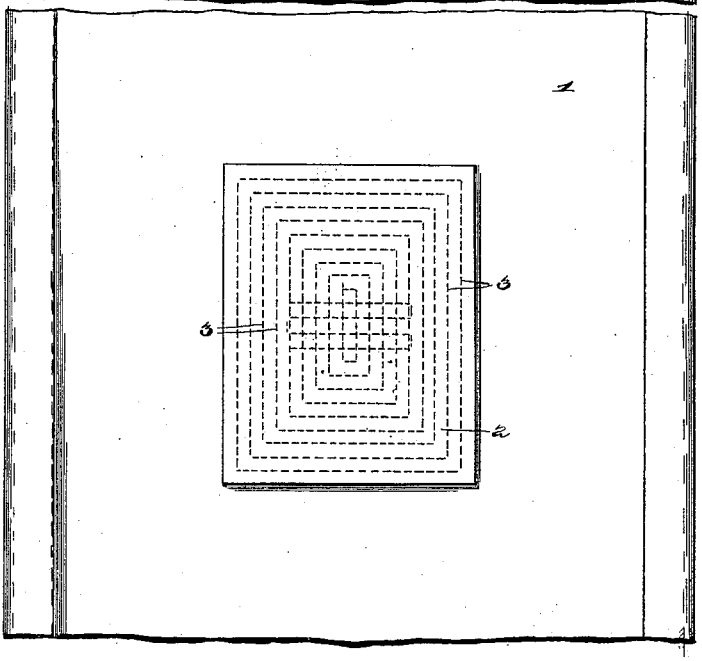
Fig. 2.
Fig. 3.
Witnesses
Inventor
Albert C. Rehbein
By his Attorneys
C. A. Snow & Co.

UNITED STATES PATENT OFFICE.

ALBERT C. REHBEIN, OF MENOMINEE, MICHIGAN.

PATCH FOR BICYCLE-TIRES.

SPECIFICATION forming part of Letters Patent No. 568,794, dated October 6, 1896.

Application filed April 11, 1895. Serial No. 545,315. (No model.)

*To all whom it may concern:*

Be it known that I, ALBERT C. REHBEIN, a citizen of the United States, residing at Menominee, in the county of Menominee and State of Michigan, have invented a new and useful Patch for Bicycle-Tires and the Like, of which the following is a specification.

The invention relates to improvements in patches for bicycle-tires and the like.

The object of the present invention is to provide a simple, inexpensive, and efficient patch for stopping leaks in bicycle-tires and the like adapted to be readily applied to the tire to be mended without inconvenience or tedious labor.

The invention consists in the construction and novel combination and arrangement of parts hereinafter fully described, illustrated in the accompanying drawings, and pointed out in the claim hereto appended.

In the drawings, Figure 1 is a plan view of a portion of a bicycle-tire provided with a patch constructed in accordance with this invention, showing the exterior of the tire. Fig. 2 is a reverse plan view of the same, showing the interior of the tire. Fig. 3 is a sectional view.

Like numerals of reference indicate corresponding parts in all the figures of the drawings.

1 designates a bicycle-tire having secured to its inner face a patch 2, adapted to cover a tear, cut, or perforation to stop the leak of a pneumatic tire, and consisting of a rectangular piece of leather or other suitable flexible material. The rectangular patch is secured to the tire by means of series of parallel rectangular rows 3 of stitches, and in order to render the patch perfectly air-tight a layer 4 of rubber cement or similar adhesive material is interposed between the patch and the inner face of the tire. The patch is stitched while the cement is in a plastic condition before the same has hardened, and by arranging the stitches in parallel rows the cement is caused to bank at each side of the rows of stitches in continuous ridges and to fill the perforations made by the same. This cement closes the perforations made by a needle in stitching the patch to the tire, and thereby renders the patch absolutely air-tight. After the patch has been applied in this manner to a tire its strength at the patch is in excess of that at any other portion of the tire and the air-holding qualities of the latter are in no wise impaired.

It will be seen that the patch is exceedingly simple and inexpensive in construction, that it is adapted to be quickly applied to a pneumatic tire, and that the air-holding qualities of the latter are in no wise impaired by the presence of the patch.

Changes in the form, proportion, and the minor details of construction may be resorted to without departing from the principle or sacrificing any of the advantages of this invention.

What I claim is—

The combination with the outer case or cover of a pneumatic tire, of a patch consisting of a piece of flexible material secured to the inner surface of the tire by means of cement, a layer of which is interposed between the adjacent faces of the tire and patch, the said patch being further secured to the tire by spaced rows of stitches extending substantially at right angles to each other, the said stitches being passed through both the patch and the tire while the cement is in a plastic condition, whereby the said plastic cement is drawn by the thread into and caused to fill the perforations formed by the stitches, in such manner as to render both the outer case and patch impervious to air, substantially as described.

In testimony that I claim the foregoing as my own I have hereto affixed my signature in the presence of two witnesses.

ALBERT C. REHBEIN.

Witnesses:
CHARLES LINE,
HENRY NASON.